(12) United States Patent
Yang et al.

(10) Patent No.: US 7,141,907 B2
(45) Date of Patent: Nov. 28, 2006

(54) BRACKET ASSEMBLY OF UNIVERSAL MOTOR

(75) Inventors: Tae-Weon Yang, Gimhae (KR); Jeong-Il Yoon, Gimhae (KR); Chang-Sub Kim, Busan (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/964,700

(22) Filed: Oct. 15, 2004

(65) Prior Publication Data

US 2005/0269896 A1    Dec. 8, 2005

(30) Foreign Application Priority Data

Jun. 5, 2004    (KR) ...................... 10-2004-0041161
Jun. 5, 2004    (KR) ...................... 10-2004-0041162

(51) Int. Cl.
*H02K 13/00*    (2006.01)
(52) U.S. Cl. ........................................ 310/239; 310/89
(58) Field of Classification Search ............ 310/89–91, 310/239, 238–247, 52–53, 59
See application file for complete search history.

(56) References Cited

U.S. PATENT DOCUMENTS

| | | | | |
|---|---|---|---|---|
| 4,355,253 A | * | 10/1982 | Vollbrecht | ................. 310/239 |
| 5,717,271 A | * | 2/1998 | Aoki et al. | ................. 310/242 |
| 5,895,995 A | * | 4/1999 | Soh | ............................ 310/239 |
| 2003/0111929 A1 | * | 6/2003 | Hong et al. | ................. 310/239 |
| 2005/0162035 A1 | * | 7/2005 | Tsergas | ..................... 310/248 |

FOREIGN PATENT DOCUMENTS

| | | |
|---|---|---|
| RU | 2171525 C1 | 7/2001 |
| SU | 752630 | 7/1980 |

* cited by examiner

*Primary Examiner*—Thanh Lam
(74) *Attorney, Agent, or Firm*—Birch, Stewart, Kolasch & Birch, LLP

(57) ABSTRACT

A bracket assembly of a universal motor comprises: a bracket composed of a base portion formed as a certain shape and coupled to a motor stator, a plurality of supporting portions extendingly formed at the base portion with a certain length, a bearing mounting portion extendingly formed at an end of the supporting portions with a certain shape and for inserting a bearing thereto, a plurality of holder portions extendingly formed at the base portion with a certain shape and having a heat emission insertion hole therein for inserting a brush and emitting heat, and a plurality of spring mounting portions; brushes respectively inserted into the bracket holder portions; and springs respectively coupled to the spring mounting portions of the bracket, for elastically supporting the brush. In the bracket assembly of a universal motor, the number of components constituting the motor is reduced thereby to greatly reduce the fabrication cost. Also, the number of assembly processes is reduced thereby to enhance assembly productivity.

9 Claims, 5 Drawing Sheets

BRACKET ASSEMBLY OF UNIVERSAL MOTOR

This Non-provisional application claims priority under 35 U.S.C. § 119(a) on Patent Application Ser. No(s). 10-2004-0041162 and 10-2004-0041161 filed in Korea, Republic of on Jun. 5, 2004, the entire contents of which are hereby incorporated by reference.

BACKGROUND OF THE INVENTION

1. Field of the Invention

The present invention relates to a universal motor, and more particularly, to a bracket assembly of a universal motor capable of reducing the number of components and facilitating an assembly operation.

2. Description of the Conventional Art

Generally, a universal motor is being widely used as a motor for a washing machine or a motor for a cleaner since a driving torque is great, an rpm in a no-load state is high, a fast rotation is easy, and both a direct current and an alternating current are used as a power source.

The universal motor is largely divided into a housing type and a frame type according to an appearance thereof. The former shields a penetration of foreign materials by installing a stator in a housing, and the latter enhances a light emitting effect by exposing a stator to outside.

FIG. 1 is a partially-cut perspective view showing one example of a universal motor in accordance with the conventional art.

As shown, the universal motor comprises: a stator 100 having a winding coil therein; a rotor 200 rotatably inserted into the stator 100; a rotation shaft 300 penetratingly-coupled to the rotor 200; a front bracket 400 formed as a certain shape and coupled to a front surface of the stator; a rear bracket 500 formed as a certain shape and coupled to a rear surface of the stator 100; a commutator 600 coupled to the rotation shaft 300 so as to be positioned at the rear bracket 500, for converting a phase of a supplied current; a brush assembly 700 mounted at the rear bracket 500, for supplying a current to the commutator 600; bearings 310 respectively mounted at the front bracket 400 and the rear bracket 500, for supporting the rotation shaft 300; and a tachometer 800 mounted at the rear bracket 500, for detecting a rotation speed of the rotation shaft 300.

FIG. 2 is a perspective view showing the rear bracket, a brush assembly mounted at the rear bracket, and a tachometer.

As shown, the rear bracket includes: a base portion 510 of a plate shape having a certain area; a bearing mounting portion 520 protruded in the base portion 510 as a cylindrical shape, for insertion-fixing the bearing 310 thereto; mounting portions 530 extension-protruded at one surface of the base portion 510 with the same interval as a certain shape; and reinforcing portions 540 protruded at one surface of the base portion 510 as a certain shape. A plurality of first screw holes 550 for coupling the stator 500 are formed at the edge of the base portion 510, and second screw holes 560 for mounting the brush assembly are formed at both sides of the bearing mounting portion 520. Two second screw holes are formed per one side, so that the total number of the second screw holes 560 is 4. Also, a through hole 570 is formed in the middle of the bearing mounting portion 520, and an extension portion 580 of a certain shape is respectively formed at both sides of the bearing mounting portion 520. The extension portion 580 is respectively provided with third screw holes 590 for mounting the tachometer.

The rear bracket 500 is formed of Al, a non-conductive material, and is fabricated by a molding.

The brush assembly 700 includes: a brush holder 710 having fixing portions 712 extendingly formed at both sides of a square holder body portion 711; a brush 720 inserted into the brush holder 710; a spring 730 inserted into the brush holder 710 and supporting the brush 720; and a cover 740 coupled to the brush holder 710 and supporting the spring 730.

The brush assembly 700 is fixed as the fixing portion 712 of the brush holder is positioned at the base portion 510 of the rear bracket and screws 750 are respectively coupled to the screw holes 713 formed at the fixing portion 712 and the second screw holes 560. The brush 720 is in contact with the commutator 600 coupled to the rotation shaft 300 by an elastic supporting of the sprig 730.

Two brush assemblies 700 are mounted at the rear bracket 500.

The tachometer 800 includes: a body portion 810 of a certain shape; fixing portions 820 respectively extended at both sides of the body portion 810; and screw holes 830 respectively formed at the fixing portions 820.

The tachometer 800 is fixed to the extension portion as the fixing portion 820 is positioned on an upper surface of the bearing mounting portion 520 in a consistent state with the extension portion 580 and screws 840 are respectively coupled to the screw holes 830 formed at the fixing portion 820 and the third screw holes 590 formed at the extension portion 580.

Operation of the universal motor is as follows.

First, when a power source is supplied to the motor, a current is applied to the brush 720 of the brush assembly through a stator winding coil. While a phase of the current applied to the brush 720 is continuously changed by the commutator 600, the current is applied to a rotor winding coil. By an interaction between a flux formed by the current applied to the stator winding coil and a flux formed by the current applied to the rotor winding coil, the rotor 200 is rotated. A rotation force of the rotor 200 is transmitted to another component through the rotation shaft 300.

The bearings 310 mounted at the front bracket 400 and the rear bracket 500 support the rotation shaft 300, and a rotation speed of the rotation shaft 300 is detected by the tachometer 800.

In fabricating the universal motor, it is important to maximize the motor efficiency and to optimize the structure thereof. When the motor efficiency is increased, a consumption power is decreased. Also, when the structure of the universal motor is optimized, the number of components is reduced and a fabrication process is simplified thereby to reduce a fabrication cost.

However, in the conventional universal motor, the brush assembly 700 mounted at the rear bracket 500 is composed of the brush holder 710, the brush 720, the spring 730, and the cover 740, and the brush assembly 700 is mounted at the rear bracket 500 by two screws 750. According to this, the number of components is relatively great and the structure is complicated. Also, the number of processes for mounting the brush assembly 700 to the rear bracket 500 is great, thereby lowering an assembly productivity and increasing a fabrication cost.

Also, when the tachometer 800 for detecting a rotation speed of the rotation shaft 300 is mounted at the rear bracket 500, the extension portion 580 has to be provided to the rear bracket 500 and the tachometer 800 has to be coupled by two screws 840. According to this, the structure is complicated and the number of assembly processes is relatively great, thereby lowering an assembly productivity and increasing a fabrication cost.

Additionally, when the rear bracket 500 is coupled to the stator 100, it is difficult to make a concentricity between the inner hole of the stator 100 for inserting the rotor 200 and the bearing mounting portion 520 of the rear bracket for coupling the bearing 310 be consistent with each other. According to this, an assembly productivity is significantly lowered.

Besides, heat generated from the brush 720 constituting the brush assembly 700 is not quickly emitted to the outside, thereby lowering the motor efficiency.

SUMMARY OF THE INVENTION

Therefore, an object of the present invention is to provide a bracket assembly of a universal motor capable of reducing the number of components, simplifying an assembly operation, and fast emitting heat generated from a brush to outside.

To achieve these and other advantages and in accordance with the purpose of the present invention, as embodied and broadly described herein, there is provided a bracket assembly of a universal motor comprising: a bracket composed of a base portion formed as a certain shape and coupled to a motor stator, a plurality of supporting portions extendingly formed at the base portion with a certain length, a bearing mounting portion extendingly formed at an end of the supporting portions with a certain shape and for inserting a bearing thereto, a plurality of holder portions extendingly formed at the base portion with a certain shape and having a heat emission insertion hole therein for inserting a brush and emitting heat, and a plurality of spring mounting portions; brushes respectively inserted into the bracket holder portions; and springs respectively coupled to the spring mounting portions of the bracket, for elastically supporting the brush.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, a bracket assembly of a universal motor according to the present invention will be explained in more detail with reference to the attached drawings.

Figure 3:
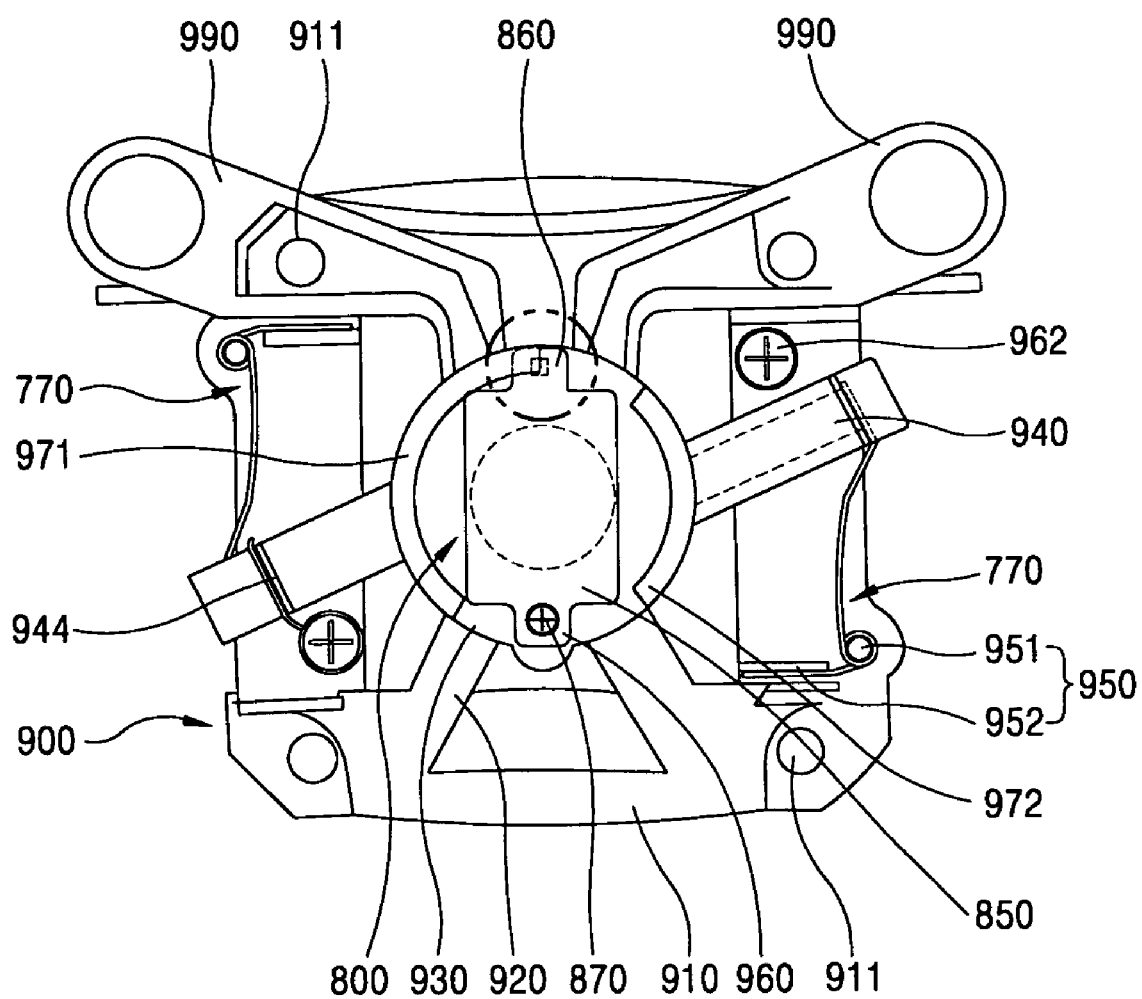
FIG. 3 is a front view showing a bracket assembly of a universal motor according to the present invention.
Figure 4:
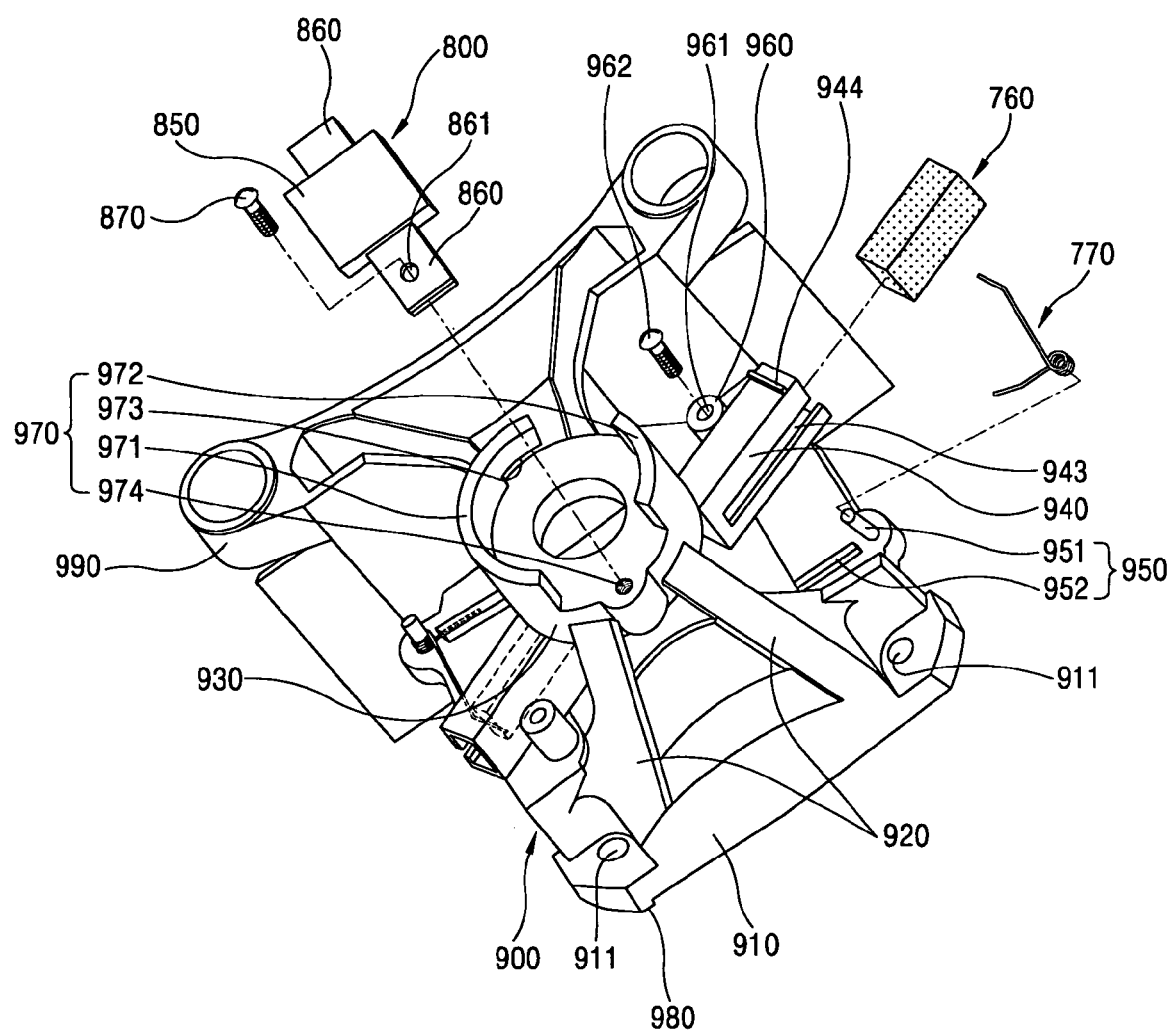
FIG. 4 is a disassembled perspective view showing the bracket assembly of the universal motor.

FIG. 3 is a front view showing a bracket assembly of a universal motor according to the present invention, and FIG. 4 is a disassembled perspective view showing the bracket assembly of the universal motor.

The universal motor having a bracket assembly according to the present invention has the same construction as that of the conventional art.

As shown in FIGS. 3 and 4, a bracket assembly of a universal motor comprises: a bracket 900 formed as a certain shape and having two holder portions 940; brushes 760 respectively inserted into the holder portions 940 of the bracket; and springs 770 mounted at the bracket 900 and elastically supporting the brush 760.

Figure 1:
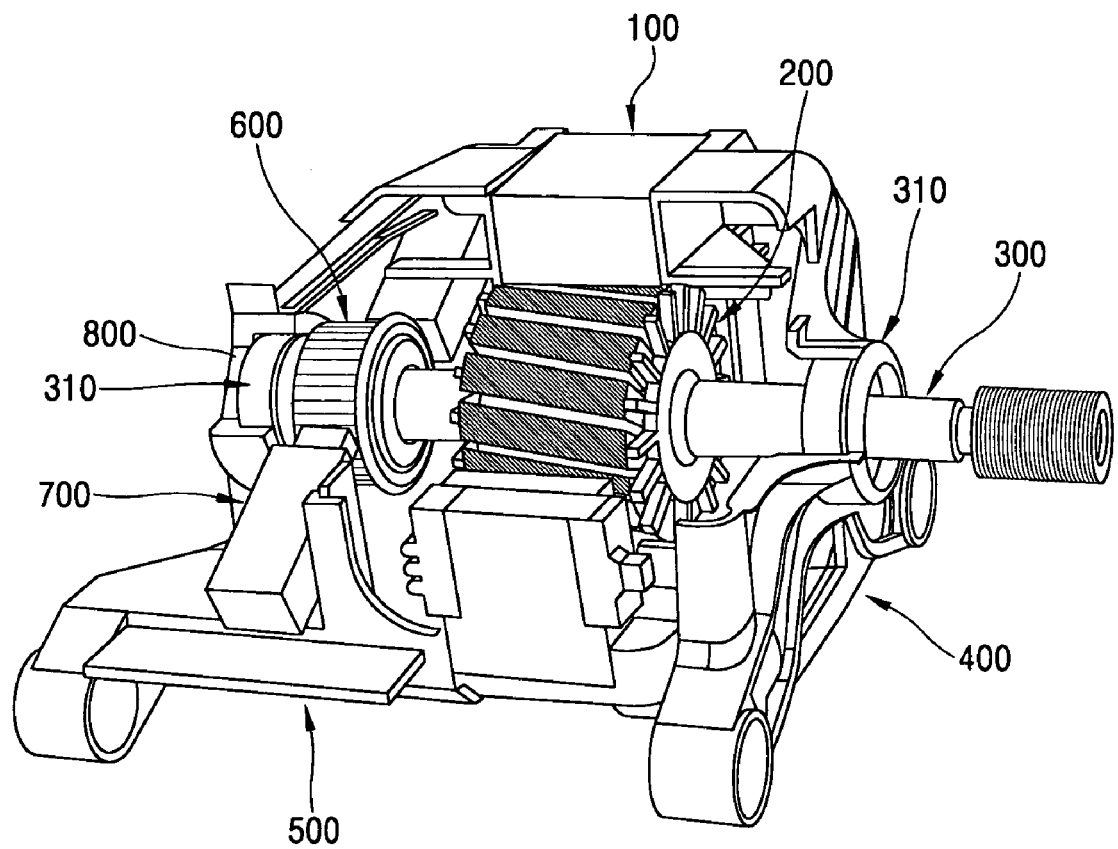
FIG. 1 is a perspective view showing a universal motor in accordance with the conventional art.
Figure 2:
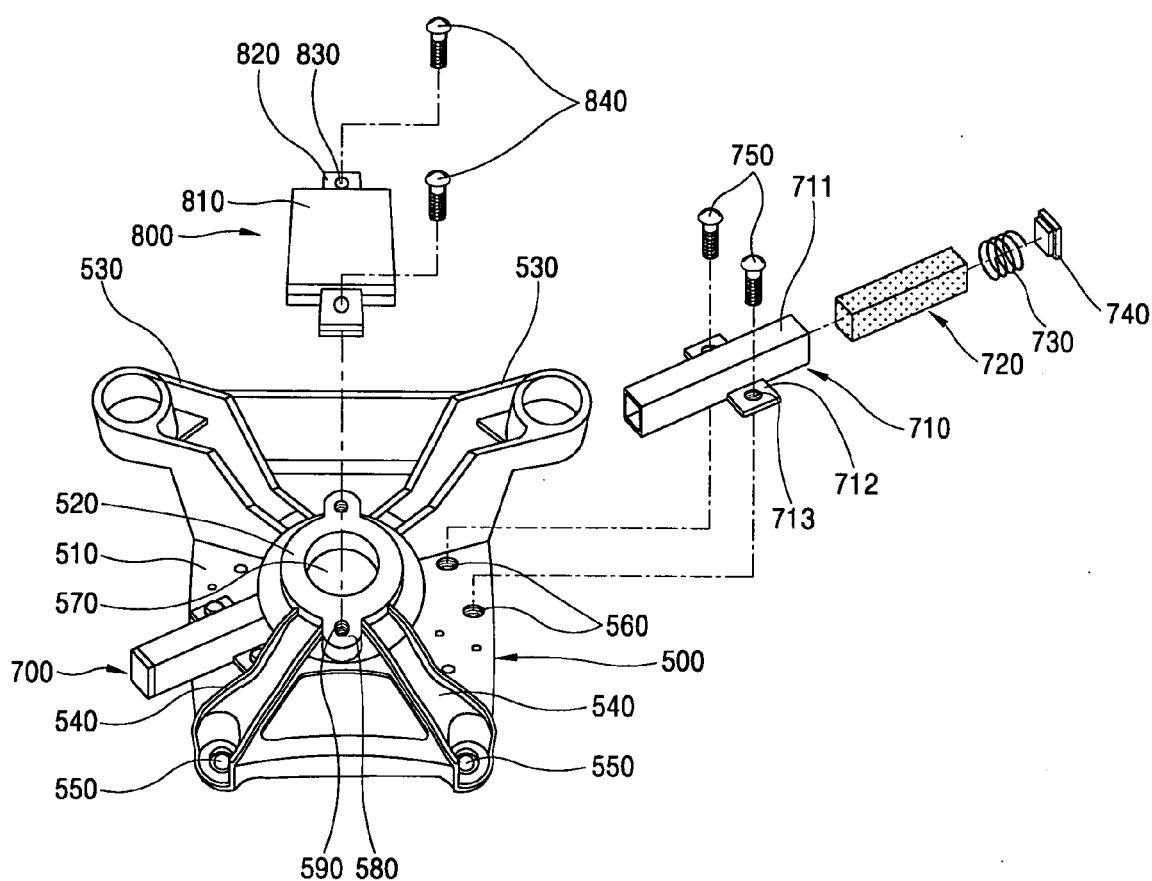
FIG. 2 is a perspective view showing a rear bracket, constituting the universal motor, a brush assembly mounted at the rear bracket, and a tachometer.

The bracket 900 includes: a base portion 910 formed as a certain shape and coupled to a motor stator (100 of FIG. 1); a plurality of supporting portions 920 extendingly formed at the base portion 910 with a certain length; a bearing mounting portion 930 extendingly formed at the end of the supporting portions 920 with a certain shape, for inserting a bearing (800 of FIG. 1) thereto; a plurality of holder portions 940 extendingly formed at the base portion 910 with a certain shape and having a heat emission insertion hole therein for inserting the brush 760 and emitting heat; and a plurality of spring mounting portions 950 extendingly formed at one side of the base portion 910.

The base portion 910 is formed as a square shape having four bars, and is provided with a bolt coupling hole 911 for a coupling the motor stator by bolts (not shown) at each edge thereof. The shape of the base portion 910 preferably corresponds to an outer shape of the motor stator. Generally, a front appearance of the motor stator is a square shape.

The bearing mounting portion 930 is formed as a cylindrical shape so that the bearing (310 of FIG. 1) can be inserted thereto, and is positioned in the middle of the base portion 910 with a certain distance from the base portion 910. The supporting portion 920 connects the base portion 910 and the bearing mounting portion 930 thereby support the bearing mounting portion 930. The bearing (310 of FIG. 1) is coupled to inside of the bearing mounting portion 930.

Figure 5:
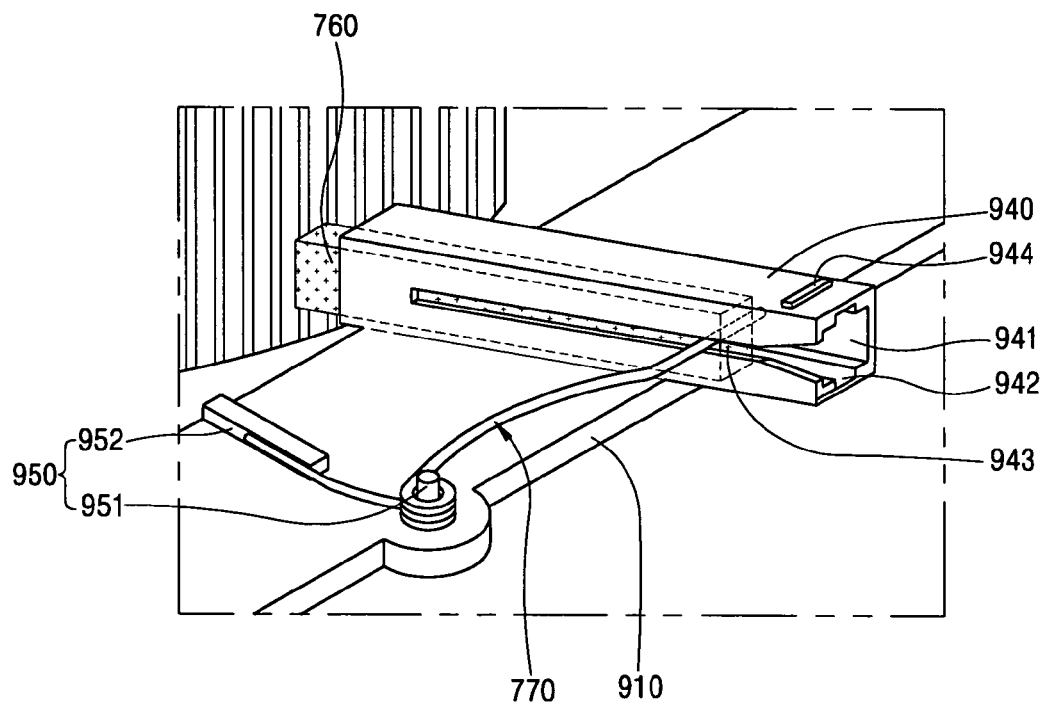
FIGS. 5 and 6 are perspective views showing the bracket assembly of the universal motor.

As shown in FIG. 5, the holder 940 is respectively formed at both sides of the bearing mounting portion 930. The holder 940 is formed as a square shape having a certain length, and a heat emission insertion hole is penetratingly formed in the holder 940 in a longitudinal direction. The holder 940 is connected to one side of the base portion 910 and the bearing mounting portion 930. The heat emission insertion hole is composed of: a through hole 941 having a shape of a sectional surface corresponding to that of the brush 760; and a heat emission groove 942 penetratingly formed at an inner wall of the through hole 941 in a longitudinal direction and emitting heat.

A slit 943 having a certain width and depth is formed at one side of the holder 940. One side of the spring 770 is inserted into the slit 943 in order to support the brush 760 inserted into the holder 940. The slit 943 can be penetratingly formed in a longitudinal direction of the holder 940.

The spring 770 is a torsion spring.

The spring mounting portion 950 is composed of: a fixing protrusion 951 protruded at one side of the base portion 910 so as to be positioned at the holder 940, for inserting the spring 770; and a stopping jaw 952 formed at one side of the base portion 910 and fixing an end coil of one side of the spring 770.

A rib 944 for supporting a wire is protruded at an upper surface of the holder 940, and a terminal fixing protrusion 960 protruded with a certain height is formed at the base portion 910. A screw hole 961 is formed in the terminal fixing protrusion 960. A wire terminal (not shown) connected to the wire is fixedly-coupled to the terminal fixing protrusion 960 by a screw 962. The wire includes a wire connected to the brush 760.

A sensor mounting portion 970 of a certain shape is formed at the bearing mounting portion 930 of the bracket. The sensor mounting portion 970 is composed of: first and second arc protrusions 971 and 972 having an arc shape of a certain thickness and height at an outer circumferential surface of the bearing mounting portion 930; a slit 973 formed at one side of the first arc protrusion 971; and a screw hole 974 formed at the bearing mounting portion 930. The first arc protrusion 971 and the second arc protrusion 972 are positioned to form a circle shape.

The tachometer 800 for detecting a rotation speed of the rotation shaft (300 of FIG. 1) is coupled to the sensor mounting portion 970. The tachometer 800 is composed of: a body portion 850 of a certain shape; fixing portions 860 respectively extended at both sides of the body portion 850; and a screw hole 861 formed at the fixing portions 820. The tachometer 800 is fixed to the sensor mounting portion 970 as the body portion 850 is inserted into the first and second arc protrusions 971 and 972, one fixing portion 860 is inserted into the slit 973 of the first arc protrusion, and a screw 870 is coupled to the screw hole 861 of another fixing portion and the screw hole 974 of the bearing mounting portion.

Figure 6:
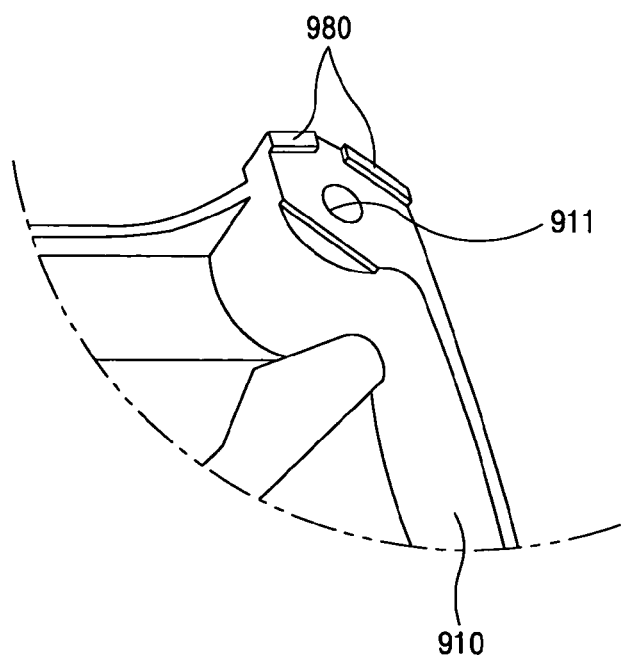

As shown in FIG. 6, a position protrusion 980 for setting an assembly position between the bracket and the stator (100 of FIG. 1) is formed at one side of the base portion 910 of the bracket. Two position protrusions 980 are formed at one side of the motor stator with a certain inclination angle so that the bracket 900 can be coupled to the motor stator.

Two mounting portions 990 are extendingly formed at the base portion 910 of the bracket as a certain shape thus to be mounted at a washing machine or a cleaner. The mounting portions 990 are arranged to have a certain angle on the basis of the bearing mounting portion 930.

The bracket 900 is formed of plastic, a non-conductive material, and is fabricated by a molding. In case of forming the bracket 900 with plastic, a fabrication process is very easy.

Hereinafter, operation of the bracket assembly of the universal motor will be explained as follows.

The bracket 900 is coupled to a rear surface of the motor stator by a plurality of bolts (not shown), and the bolts are respectively penetratingly-coupled to the bolt coupling holes 911 of the bracket. At this time, a coupling position between the bracket 900 and the motor stator is set as the position protrusion 980 formed at the bracket 900 is coupled to the edge of the motor stator (100 of FIG. 1). According to this, the concentricity between the bearing (310 of FIG. 1) coupled to the bracket 900 and the rotation shaft (300 of FIG. 1) of the rotor (200 of FIG. 1) inserted into the stator can be easily made to be consistent with each other.

One side of the rotation shaft is insertion-fixed to the bearing coupled to the bracket 900. The brush 760 is respectively inserted into two holder portions 940 and the spring 770 is fixedly-coupled to the spring mounting portion 950, so that the spring 770 elastically supports the brush 760. The tachometer 800 is mounted at the sensor mounting portion 970.

In the present invention, the holder 940 into which the brush 760 is inserted is integrally formed with the bracket 900. Also, the spring 770 is mounted at the spring mounting portion 950 thereby to elastically support the brush 760 inserted into the holder 940 only by the spring 770. According to this, components for contact-supporting the brush 760 to commutator are simple, and the number of assembly processes is decreased. In the conventional art, two screws 750 are provided in order to fix the brush holder 710, the brush 720, the spring 730, the cover 740, and the brush holder 710 to the bracket 500, thereby increasing the number of components and complicating an assembly process.

Also, in the present invention, frictional heat generated at the brush 760 while the motor is operated is emitted through the heat emission insertion hole and is the slit 943 of the holder 940, thereby quickening the heat emission.

Also, the tachometer 800 for detecting a rotation speed of the rotation shaft (300 of FIG. 1) is inserted into the slit 973 of the sensor mounting portion 970, and fixedly-coupled to the sensor mounting portion 970 by one screw 870. According to this, the number of components is decreased and an assembly process is simplified.

Additionally, the wires are supported by the rib 944 of the bracket and fixed to the terminal fixing protrusion 960 by the screw 962, thereby simplifying the structure.

As aforementioned, in the bracket assembly of the universal motor, the number of components constituting the universal motor is decreased thereby to greatly reduce the fabrication costs. Also, the number of assembly processes is decreased thereby to enhance assembly productivity.

Additionally, as a coupling position between the bracket 900 and the motor stator (100 of FIG. 1) is precise, a concentricity between the rotation shat (300 of FIG. 1) of the rotor inserted into the motor stator and the bearing (310 of FIG. 1) coupled to the bracket 900 becomes precise, thereby enhancing a reliability of the motor. Also, as frictional heat generated from the brush 760 is fast emitted, heating of the motor is prevented thereby to enhance the motor efficiency.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A bracket assembly of a universal motor comprising:
a bracket including a base portion coupled to a motor stator; a plurality of supporting portions extendingly formed at the base portion; a bearing mounting portion extendingly formed at an end of the supporting portions, for inserting a bearing thereto; a plurality of holder portions extendingly formed at the base portion and having a heat emission insertion hole therein for inserting a brush and emitting heat; a plurality of spring mounting portions; and a plurality of mounting portions formed at the base portion;

brushes respectively inserted into the holder portions;

a sensor mounting portion formed at the bearing mounting portion of the bracket;

a tachometer for detecting a rotation speed of a rotation shaft inserted into the sensor mounting portion as one side thereof is fixedly-coupled and another side therof is coupled by a screw; and springs respectively coupled to the spring mounting portions of the bracket, for elastically supporting the brush, wherein a respective holder portion includes a slit formed at only one side of the respective holder portion for receiving a corresponding spring to elastically support an inserted brush and the bracket is formed of a plastic material, and wherein the sensor mounting portion includes:

first and second arc protrusions extendingly formed at an outer circumferential surface of the bearing mounting portion as an arc shape;

an inserting slit formed at one side of the first arc protrusion, for inserting one side of the tachometer; and a screw hole formed at the bearing mounting portion, for coupling the screw.

2. The bracket assembly of the universal motor of claim 1, wherein the base portion is formed to correspond to an outer shape of the motor stator.

3. The bracket assembly of the universal motor of claim 1, wherein the heat emission insertion hole includes:

a through hole having a shape of a sectional surface corresponding to that of an inserted brush; and a heat emission groove penetratingly formed at an inner wall of the through hole in a longitudinal direction and for emitting heat.

4. The bracket assembly of the universal motor of claim 1, wherein the spring mounting portion includes:

a fixing protrusion at one side of the base portion so as to be positioned at a lateral portion of the holder, for inserting the spring; and a stopping jaw formed at one side of the base portion and fixing an end coil of one side of the spring.

5. The bracket assembly of the universal motor of claim 1, further comprising a position protrusion for setting an assembly position between the bracket and the stator formed at one side of the base portion of the bracket.

6. The bracket assembly of the universal motor of claim 1, further comprising:

a rib protruded at the holder of the bracket, for supporting a wire; and a terminal fixing protrusion protruded at the base portion with a certain height and having a screw hole therein, for fixing a terminal coupled to an end portion of the wire by a screw.

7. A universal motor comprising:

a stator;

a rotor rotatably inserted into the stator;

a rotation shaft coupled to the rotor;

a commutator coupled to the rotation shaft;

a front bracket and a rear bracket respectively coupled to both sides of the stator;

a brush mounted at the rear bracket, for supplying a current to the commutator;

a brush holder for inserting the brush;

a sensor mounting portion formed at the rear bracket; and a tachometer for detecting a rotation speed of the rotation shaft inserted into the sensor mounting portion as one side thereof is fixedly-coupled and another side thereof is coupled by a screw, wherein the rear bracket and the brush holder are monolithically formed, and wherein the sensor mounting portion includes:

first and second arc protrusions extendingly formed at an outer circumferential surface of the rear bracket as an arc shape;

an inserting slit formed at one side of the first arc protrusion, for inserting one side of the tachometer; and a screw hole formed at the rear bracket, for coupling the screw.

8. The universal motor of claim 7, wherein the brush holder includes a slit formed at only one side of the brush holder for receiving a spring to elastically support the inserted brush.

9. The universal motor of claim 7, wherein the brush holder includes:

a through hole having a shape of a sectional surface corresponding to that of the inserted brush; and a heat emission groove penetratingly formed at an inner wall of the through hole in a longitudinal direction and for emitting heat.

* * * * *